US012144055B2

(12) United States Patent
Priyanto et al.

(10) Patent No.: US 12,144,055 B2
(45) Date of Patent: Nov. 12, 2024

(54) EARLY ACTIVATION OF DISCONTINUOUS RECEPTION

(71) Applicant: Sony Corporation, Tokyo (JP)

(72) Inventors: Basuki Priyanto, Lund (SE); Nafiseh Mazloum, Lund (SE); Anders Berggren, Lund (SE); Rickard Ljung, Helsingborg (SE)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/053,269

(22) PCT Filed: May 2, 2019

(86) PCT No.: PCT/EP2019/061271
§ 371 (c)(1),
(2) Date: Nov. 5, 2020

(87) PCT Pub. No.: WO2019/215014
PCT Pub. Date: Nov. 14, 2019

(65) Prior Publication Data
US 2021/0243835 A1  Aug. 5, 2021

(30) Foreign Application Priority Data
May 9, 2018  (SE) .................................... 1830155-6

(51) Int. Cl.
*H04W 76/28* (2018.01)
*H04L 41/0803* (2022.01)
(Continued)

(52) U.S. Cl.
CPC ......... *H04W 76/28* (2018.02); *H04L 41/0803* (2013.01); *H04W 24/08* (2013.01);
(Continued)

(58) Field of Classification Search
CPC ..... H04W 76/28; H04W 76/10; H04W 24/08; H04W 52/0235; H04W 72/1289; H04L 41/0803
(Continued)

(56) References Cited

U.S. PATENT DOCUMENTS

2007/0260851 A1* 11/2007 Taha ................. H04W 52/0229
712/204
2012/0120815 A1   5/2012 Anderson
(Continued)

FOREIGN PATENT DOCUMENTS

EP           2395797 B1   10/2013

OTHER PUBLICATIONS

International Search Report and Written Opinion from corresponding International Application No. PCT/EP2019/061271, mailed on Jun. 19, 2019, 8 pages.
Austek, "DRX Command MAC Control Element", 3GPP TSG-RAN2 Meeting #99, R2-1709321, Aug. 21-25, 2017, 4 pages.
MediaTek Inc., "DRX configuration for NR", 3GPP TSQ-RAN WG2 #98, R2-1704944, May 15-19, 2017, 3 pages.

*Primary Examiner* — Xuan Lu
(74) *Attorney, Agent, or Firm* — Tucker Ellis LLP

(57) ABSTRACT

A method of operating a terminal device (101) includes configuring a data connection (189) on a wireless link (114) between the terminal device (101) and a network (100) based on a first control signal (4001-4003) native to a first layer (255) of a transmission protocol stack (250) associated with the wireless link (114). The method also includes participating in a data communication via the data connection (189). The method also includes receiving a second control signal (205) native to a second layer (251) of the transmission protocol stack (250), the second layer (251) being arranged lower in hierarchy of the transmission protocol stack (250) than the first layer (255). The method also
(Continued)

includes in response to receiving the second control signal (205): activating a discontinuous reception (390) for the data communication.

19 Claims, 14 Drawing Sheets

(51) Int. Cl.
*H04W 24/08* (2009.01)
*H04W 52/02* (2009.01)
*H04W 72/23* (2023.01)
*H04W 76/10* (2018.01)

(52) U.S. Cl.
CPC ....... *H04W 52/0235* (2013.01); *H04W 72/23* (2023.01); *H04W 76/10* (2018.02)

(58) Field of Classification Search
USPC ........................................................ 370/254
See application file for complete search history.

(56) References Cited

U.S. PATENT DOCUMENTS

| | | | |
|---|---|---|---|
| 2013/0107782 A1* | 5/2013 | Anas | H04W 72/1231 370/311 |
| 2015/0282080 A1* | 10/2015 | Maattanen | H04W 52/0216 370/311 |
| 2015/0365995 A1* | 12/2015 | Tabet | H04W 76/28 370/311 |
| 2016/0242231 A1* | 8/2016 | Vajapeyam | H04W 76/28 |
| 2017/0150440 A1 | 5/2017 | Cave | |
| 2017/0272999 A1* | 9/2017 | Tsai | H04W 52/0274 |
| 2017/0359850 A1* | 12/2017 | Loehr | H04W 72/042 |
| 2018/0098287 A1* | 4/2018 | Ang | H04W 52/0229 |
| 2018/0368112 A1* | 12/2018 | Sebeni | H04W 52/0209 |
| 2019/0037495 A1* | 1/2019 | John Wilson | H04W 56/001 |
| 2021/0014791 A1* | 1/2021 | Freda | H04W 52/0229 |

* cited by examiner (reference implementation)

(reference implementation)

EARLY ACTIVATION OF DISCONTINUOUS RECEPTION

TECHNICAL FIELD

Various embodiments of the invention generally relate to activating discontinuous reception. Various embodiments of the invention specifically relate to activating the discontinuous reception in response to receiving a control signal native to a lower layer of a transmission protocol stack.

BACKGROUND

Wireless communication is an integral part of modern life. Reducing energy consumption of wireless communication is an important task. Reference techniques implement discontinuous reception (DRX) to reduce the energy consumption. DRX comprises transitioning a wireless interface of a terminal (UE) to an low-power state. When operating in the low-power state, the wireless interface may have limited operational capabilities if compared to an active state. For example, the wireless interface may be unfit to receive certain signals, e.g., such signals of higher-complexity modulation, etc.

SUMMARY

A need exists for advanced techniques of activating DRX.

This need is met by the features of the independent claims. The features of the dependent claims define embodiments.

A method of operating a terminal device includes configuring a data connection on a wireless link between the terminal device and a network based on a first control signal native to a first layer of a transmission protocol stack associated with the wireless link. The method also includes participating in a data communication via the data connection. The method also includes receiving a second control signal native to a second layer of the transmission protocol stack. The second layer is arranged lower in hierarchy of the transmission protocol stack than the first layer. The method also includes, in response to receiving the second control signal: activating a discontinuous reception for the data communication.

A computer program or a computer program product includes program code. The program code can be executed by at least one processor. Executing the program code causes the at least one processor to perform a method of operating a terminal device. The method includes configuring a data connection on a wireless link between the terminal device and a network based on a first control signal native to a first layer of a transmission protocol stack associated with the wireless link. The method also includes participating in a data communication via the data connection. The method also includes receiving a second control signal native to a second layer of the transmission protocol stack. The second layer is arranged lower in hierarchy of the transmission protocol stack than the first layer. The method also includes, in response to receiving the second control signal: activating a discontinuous reception for the data communication.

A terminal device configured to configure a data connection on a wireless link between the terminal device and a network based on a first control signal native to a first layer of a transmission protocol stack associated with the wireless link. The terminal device is also configured to participate in a data communication via the data connection. The terminal device is also configured to receive a second control signal native to a second layer of the transmission protocol stack. The second layer is arranged lower in hierarchy of the transmission protocol stack than the first layer. The terminal device is also configured to activate a discontinuous reception for the data communication in response to receiving the second control signal.

A method of operating a base station of a network includes configuring a data connection on a wireless link between the terminal device and the network. Said configuring of the data connection is based on a first control signal. The first control signal is native to a first layer of a transmission protocol stack associated with the wireless link. The method also includes participating in a data communication via the data connection and transmitting a second control signal native to a second layer of the transmission protocol stack. The second layer is arranged lower in hierarchy of the transmission protocol stack than the first layer. The method also includes activating a discontinuous reception for the data communication in response to transmitting the second control signal.

A computer program or a computer program product includes program code. The program code can be executed by at least one processor. Executing the program code causes the at least one processor to perform a method of operating a base station of a network. The method includes configuring a data connection on a wireless link between the terminal device and the network. Said configuring of the data connection is based on a first control signal. The first control signal is native to a first layer of a transmission protocol stack associated with the wireless link. The method also includes participating in a data communication via the data connection and transmitting a second control signal native to a second layer of the transmission protocol stack. The second layer is arranged lower in hierarchy of the transmission protocol stack than the first layer. The method also includes activating a discontinuous reception for the data communication in response to transmitting the second control signal.

A base station is configured to configure a data connection on a wireless link between the terminal device and the network based on a first control signal native to a first layer of a transmission protocol stack associated with the wireless link. The base station is configured to participate in a data communication via the data connection. The base station is configured to transmit a second control signal native to a second layer of the transmission protocol stack, the second layer being arranged lower in hierarchy of the transmission protocol stack than the first layer. The base station is also configured to activate a discontinuous reception for the data communication in response to transmitting the second control signal.

DETAILED DESCRIPTION OF EMBODIMENTS

Figure 1:
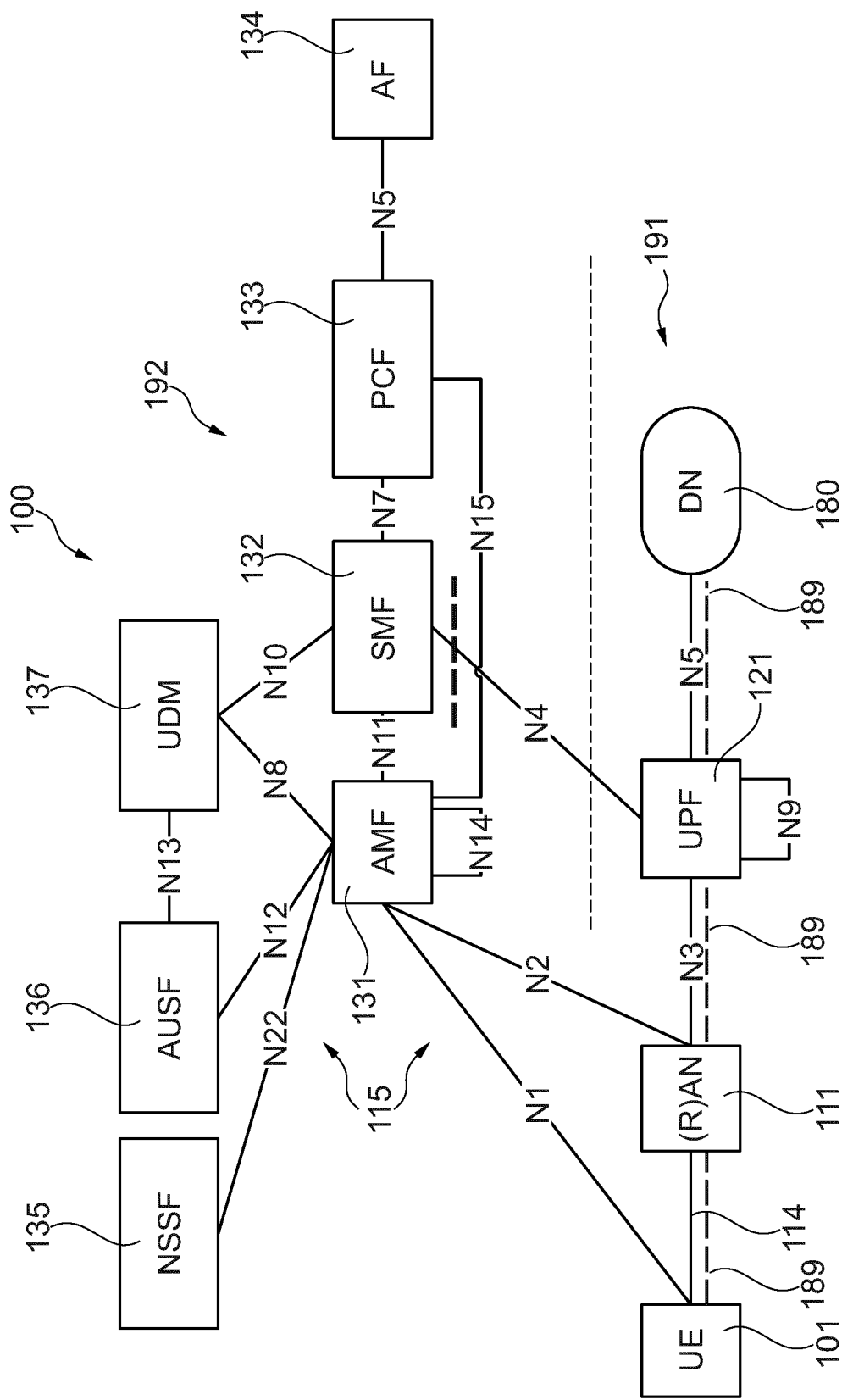
FIG. 1 schematically illustrates a cellular network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wirelessly communicating using a communication network are described. The communication network may be a wireless network. For sake of simplicity, various scenarios are described hereinafter with respect to an implementation of the communication network by a cellular network. The cellular network includes multiple cells. Each cell corresponds to a respective sub-area of the overall coverage area. Other example implementations include Institute of Electrical and Electronics Engineers (IEEE) WLAN network, MulteFire, etc. . . .

Hereinafter, techniques of reducing energy consumption at the UE are described. Specifically, techniques are described which enable efficient activation of DRX. For example, by means of the techniques described herein, DRX can be flexibly activated, e.g., on demand, such as based on specific physical layer configurations for a given UE. Thereby, the time that a wireless interface of the UE is required to operate in an active state is reduced; hence, the energy consumption of the UE can be reduced.

As a general rule, the wireless interface may include a receiver and/or a transmitter. The wireless interface may include analog circuitry and/or digital circuitry. The wireless interface may include a power supply for such circuitry.

Specifically, various examples relate to a scenario in which the UE operates in connected mode. In the connected mode, a data connection for data communication has been established between the UE and the network. This is in contrast to, e.g., idle mode, where the data connection has been released and the UE-before being able to participate in the data communication-needs to (re-)establish a data connection.

Various techniques are based on the finding that, in connected mode, the UE is typically required to monitor a control channel when waiting for uplink (UL) data and/or downlink (DL) data of the data connection. Then, activation of the DRX can be delayed, e.g., in accordance with a value of an inactivity timer. Also, on a more general level, parameters of the DRX are typically configured on Radio Resource Control (RRC) level, i.e., using control signals native to the RRC layer of a transmission protocol stack. RRC control signaling can be slow.

RRC control signaling can be slow if compared to changes in the traffic pattern and/or changes in a buffer status at the BS and/or at the UE. Namely, such changes in the traffic pattern and/or the buffer status can often be addressed by scheduling control signals native to the physical (PHY) layer, i.e., Layer 1 of the transmission protocol stack. Typically, the latency associated with scheduling control signaling can be on the order of milliseconds or less than one millisecond; while the latency associated with RRC control signaling can be on the order of several 10 of milliseconds.

Additionally, the flexibility of the RRC control signaling can be limited. Often, DRX parameters are configured using RRC control signaling at the connection setup, but then are not dynamically changed over time.

Various techniques described herein are based on the finding that such shortcomings of RRC control signaling to configure DRX parameters can result in unnecessary time of the wireless interface of the UE operating in the active state; in other words, various techniques are based on the finding that activation of the DRX can be unnecessarily delayed due to the latency of a static RRC configuration, typically in combination with a fixed inactivity timer implemented at the UE to trigger activation of DRX. Then, the UE may spend too much time and energy before activating DRX and transitioning the wireless interface into the low-power state.

According to various examples, such shortcomings of reference implementations of activating DRX are mitigated by using lower-layer control signaling to activate the DRX. For example, a control signal native to the PHY layer can be used to indicate to the UE that the DRX should be activated, i.e., to trigger activation of DRX. Then, the UE, in response to receiving the respective control signal, can activate the DRX.

According to various examples, such techniques can be employed for DRX during connected mode. Here, a data connection can be configured on a wireless link between the UE and the network based on a first control signal which is native to a first layer of a transmission protocol stack associated with the wireless link. For example, it would be possible that the first control signal is native to the RRC layer/Layer 3 of the transmission protocol stack. Then, the UE can participate in a data communication via the data connection. This may include transmitting of UL data of the data communication and/or receiving of DL data of the data communication. Then, a second control signal native to a second layer of the transmission protocol stack may be received, wherein the second layer is arranged lower in hierarchy of the transmission protocol stack than the first layer. For example, as mentioned above, the second control signal may be native to the PHY layer/Layer 1. In response to receiving the second control signal, the UE may activate the DRX for the data communication to minimize UE power consumption. Hence, the UE may continue to operate in connected mode, and the data communication may not be released. Rather, the DRX is implemented for the data communication of the data connection.

As an example implementation of the second control signal, DL control information (DCI) may be employed. DCI for LTE is specified in 3GPP Technical Specification (TS) 36.212, version 15.1.0 (2018 April), section 5.3.3. In NR, TS 38.212, version 15.1.1 (2018 April) section 7.3.

By such techniques of using the second control signal which is native to a lower layer compared to the first control signal, it is possible to avoid semi-static RRC control signaling and/or an RRC-configured inactivity timer to activate the DRX. Rather, the DRX can be dynamically controlled. For example, it is possible to control dynamically how long the UE should listen for further data scheduling on a control channel before transitioning the wireless interface into the low-power state. Thereby, operation of the UE wireless interface can be optimized, e.g., in the UE-specific manner. The overall energy consumption in connected mode can be reduced: e.g., the UE may be instructed to activate DRX as fast as possible when no further DL data is to be scheduled by the BS.

FIG. 1 schematically illustrates a cellular network 100. The example of FIG. 1 illustrates the network 100 according to the 3GPP 5G architecture. Details of the fundamental architecture are described in 3GPP TS 23.501, version 1.3.0 (2017 September). While FIG. 1 and further parts of the following description illustrate techniques in the 3GPP 5G framework, similar techniques may be readily applied to different communication protocols. Examples include 3GPP LTE 4G Machine Type Communication (MTC) and IEEE Wi-Fi technology.

In the scenario of FIG. 1, a UE 101 is connectable to the network 100. For example, the UE 101 may be one of the following: a cellular phone; a smart phone; an IOT device; a MTC device; a sensor; an actuator; etc.

The UE 101 is connectable to the network 100 via a radio access network (RAN) 111, typically formed by one or more BSs (not illustrated in FIG. 1). A wireless link 114 is established between the RAN 111—specifically between one or more of the BSs of the RAN 111—and the UE 101.

The wireless link 114 may be implemented on a carrier. The carrier may include a number of sub-carriers. The wireless link 114 and, as such the carrier, may be associated with a communication system. For example, the communication system may be identified by a system identification registered to transmission on the carrier. The system identification may be a unique identity of the communication system. Thereby, different operators may co-deploy communication systems in the same spatial area; different UEs can selectively use different communication systems based on the system identification.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; non-access stratum (NAS) termination; connection management including registration of whether the UE operates in connected mode; reachability management; mobility management; access authentication; and access authorization. For example, the AMF 131 controls CN-initiated wake-up and/or paging of the UEs 101: The AMF 131 may trigger transmission of WUS and/or paging signals of the UE 101. The AMF 131 may keep track of the timing of DRX employed by the UE 101.

A data connection 189 is established by the AMF 131 using RRC control signals if the respective UE 101 operates in a connected mode. The data connection 189 is sometimes also referred to as bearer. To keep track of the current mode of the UEs 101, the AMF 131 sets the UE 101 to evolved packet system (EPS) connection management (ECM) connected or ECM idle. During ECM connected, a NAS connection is maintained between the UE 101 and the AMF 131. The NAS connection may be set up in response to wake-up and/or paging of the UE 101, using a random access (RA) transmission.

The data connection 189 is established between the UE 101 via the RAN 111 and the UP 191 of the CN 115 and towards the DN 180. For example, a connection with the Internet or another packet data network can be established. A server of the DN 180 may host a service for which payload data is communicated via the data connection 189. The data connection 189 may include one or more bearers such as a dedicated bearer or a default bearer. The data connection 189 may be defined on/be native to the RRC layer.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

Figure 2:
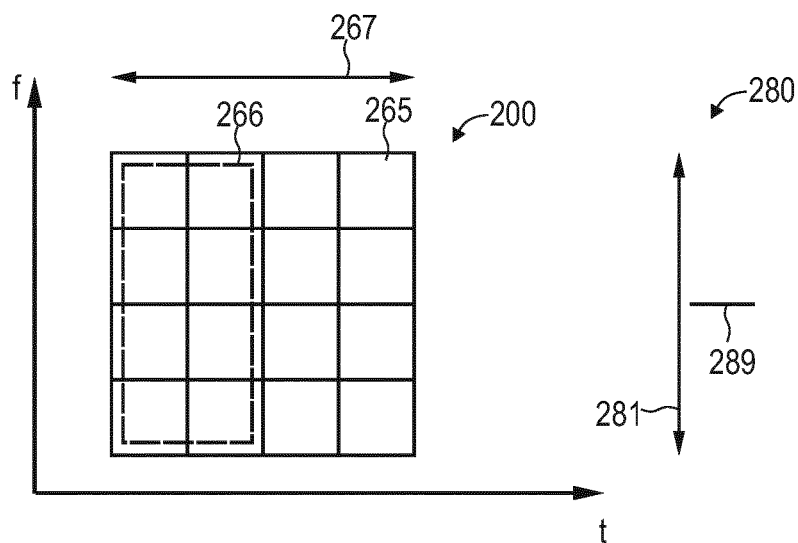
FIG. 2 schematically illustrates a time-frequency resource grid including resources on a wireless link of a cellular network according to various examples.

FIG. 2 illustrates aspects with respect to a carrier 280. The carrier 280 has a center frequency 289 and a bandwidth 281. The carrier 280 defines a time-frequency resource grid 200.

Generally, the carrier is a waveform—e.g., a periodic waveform such as a sinusoidal waveform—that is modulated based on an input signal for conveying information. The center frequency 289 of the carrier is referred to as carrier frequency which is higher than the frequency of the input signal, sometimes referred to as baseband frequency. Different carriers occupying different frequency bands can be communicated with limited interference, based on the concept of frequency division duplex (FDD). Often, different carriers 280 are associated with different communication systems. Different carriers may or may not be served by the same BS.

FIG. 2 also illustrates aspects with respect to the time-frequency resource grid 200. The time-frequency resource grid 200 includes multiple time-frequency resources 265. In the scenario of FIG. 2, the carrier 280 includes multiple sub-carriers, defining the frequency-domain spacing of the time-frequency resources 265; albeit this is generally optional. For example, for an Orthogonal Frequency Division Multiplex (OFDM) modulation, multiple sub-carriers may be defined by the carrier 280. As time progresses, the carrier 280 encodes different data. The atomic time-frequency resources 265 is sometimes referred to as resource element. A resource element can be defined by the symbol duration in time domain and/or a subcarrier or a carrier width in frequency domain.

Sometimes, multiple resource elements 265 are grouped into resource groups 266. Resource groups 266 can be helpful for scheduling purposes—e.g., using DCI—, to limit a control signaling overhead by not having to address individual resource elements 265.

Further, transmission on the wireless link 114 can be structured in time domain by using transmission frames 267. Transmission frames 267 have certain duration and include a certain number of resource elements 265 and resource groups 266. Repetitive allocation of resource elements 265 resource groups 266 to certain channels becomes possible by using the transmission frames 267. Typically, transmission frames 267 are labelled using sequence numbers that are signaled on resource elements 265 in a header of the transmission frames 267.

Figure 3:
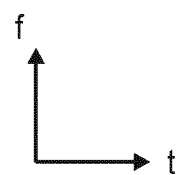
FIG. 3 schematically illustrates resources allocated to various channels on the wireless link of the cellular network according to various examples.

FIG. 3 illustrates aspects with respect to channels 261-264 implemented on the wireless link 114. The wireless link 114 implements a plurality of communication channels 261-264. Each channel 261-264 may be allocated to one or more resource elements 265 or resource groups 265.

While in FIG. 3 a scenario is illustrated in which the channels 261-264 occupy adjacent resources, this is generally not necessary. There may be gaps in-between resources allocated to different channels.

For example, a first channel 261 may carry reference signals, e.g., channel sounding reference signals and/or synchronization signals for acquiring the timing and frequency reference.

A second channel 262 may carry paging signals which enable the network 100—e.g., the AMF 131 (or a MME in the 3GPP evolved packet core)—to page the UE 101. The paging signals may thus be communicated in dedicated resources of the channel 262.

A third channel 263 may carry control signals such as Layer 1 control signals. An example includes DCI. For example, Layer 1 control signals such as DCI are typically communicated on a Physical DL Control Channel (PDCCH).

Further, a fourth channel 264 is associated with a payload signal encoding payload data and higher-layer control signals. For example, payload messages carrying higher-layer user-plane data packets associated with a given service implemented by the UE 101 and the BS can be communicated on such a payload channel 264. User-data messages may be transmitted via the payload channel 264. Layer 3 or RRC control signals may be transmitted via the channel 264, e.g., a paging message. An example is the Physical DL Shared Channel (PDSCH).

Figure 4:
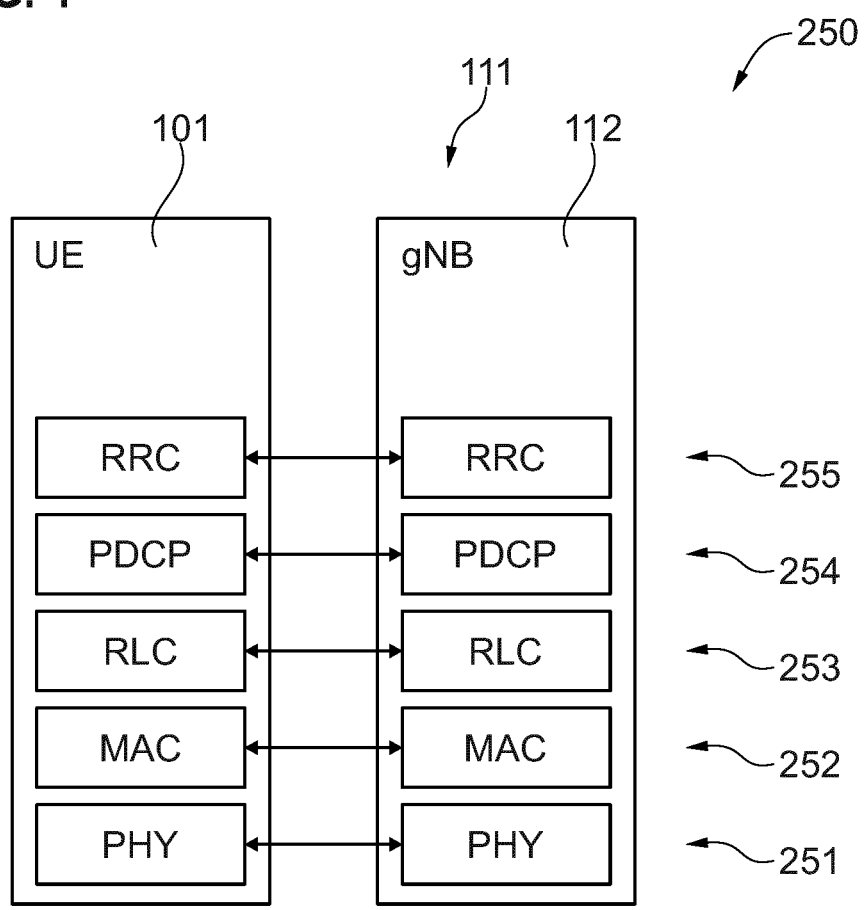
FIG. 4 schematically illustrates a transmission protocol stack of the wireless link according to various examples.

FIG. 4 illustrates aspects with respect to a transmission protocol stack 250 implemented for control signaling between the UE 101 and a BS 112 of the RAN 111 (labelled gNB in FIG. 3, according to the 3GPP 5G terminology). Specifically, FIG. 4 schematically illustrates a control signaling transmission protocol stack 250. The transmission protocol stack 250 is based on the Open System Interface (OSI) model. The OSI model defines Layers 1-7.

The transmission protocol stack 250 may be employed for a layer encapsulation concept. Layer encapsulation may be employed in the various examples described herein. Here, certain control functionality and associated control signaling is managed by a respective layer—e.g., for RRC functionality by Layer 3. Each layer may include layer-specific, encapsulated processing logic that may be implemented in software and/or hardware. Other layers are not directly involved. For example, lower layers may transparently forward control signaling native to a given layer. This control signaling may terminate at the given layer and higher layers may thus not be involved, as well. Thus, control signaling native to the given layer may be processed by processing logic of that given layer.

The transmission protocol stack 250 includes a Layer 1 251, the so-called PHY layer. The PHY layer 251 is lowest in hierarchy. The PHY layer 251 implements functionality of transmitting raw bits via the wireless link 114. The PHY layer 251 can access the transmission medium. This includes analog signal processing. The PHY layer 251 provides for low-latency control signaling including transmission of scheduling information, e.g. DCI.

The transmission protocol stack 250 also includes Layer 2 functionality (Data Link layer in the OSI model) provided by the Medium Access (MAC) layer 252 and the Radio Link Control (RLC) layer 253. These layers 252, 253 are up in hierarchy if compared to the PHY layer 251. The RLC layer 253 provides for one or more of the following functionalities: error correction using an Automatic Repeat Request (ARQ) protocol, segmentation and reordering of protocol data units, scheduling, etc. The MAC layer 252 provides for one or more of the following functionalities: control of access to the physical transmission medium, framed the limiting and recognition; etc.

Next, Layer 3 (Network layer in the OSI model) is implemented by the Packet Data Convergence Protocol (PDCP) layer 254 which provides one or more of the following functionalities: transfer of application data and control data; header compression such as robust header compression (RoHC); Access Stratum (AS) level security. Layer 3 is also implemented by the RRC layer 255 which provides for control signaling functionality between the UE 101 and the BS 112. The RRC layer 255 provides one or more of the following functionalities: data connection bearer establishment and release; paging notification; broadcasting of system information.

As will be appreciated from FIG. 4, the Network layer 255, 254 is above the Data Link layer 253, 252 and the PHY layer 251 in the hierarchy of the transmission protocol stack 250.

Not illustrated in FIG. 4 is an application layer (e.g., Layer 7), a presentation layer (e.g., Layer 6), a session layer (e.g., Layer 5), and a transport layer (e.g., Layer 4), all stacked upon Layer 3 implemented by the RRC layer 255.

Figure 5:
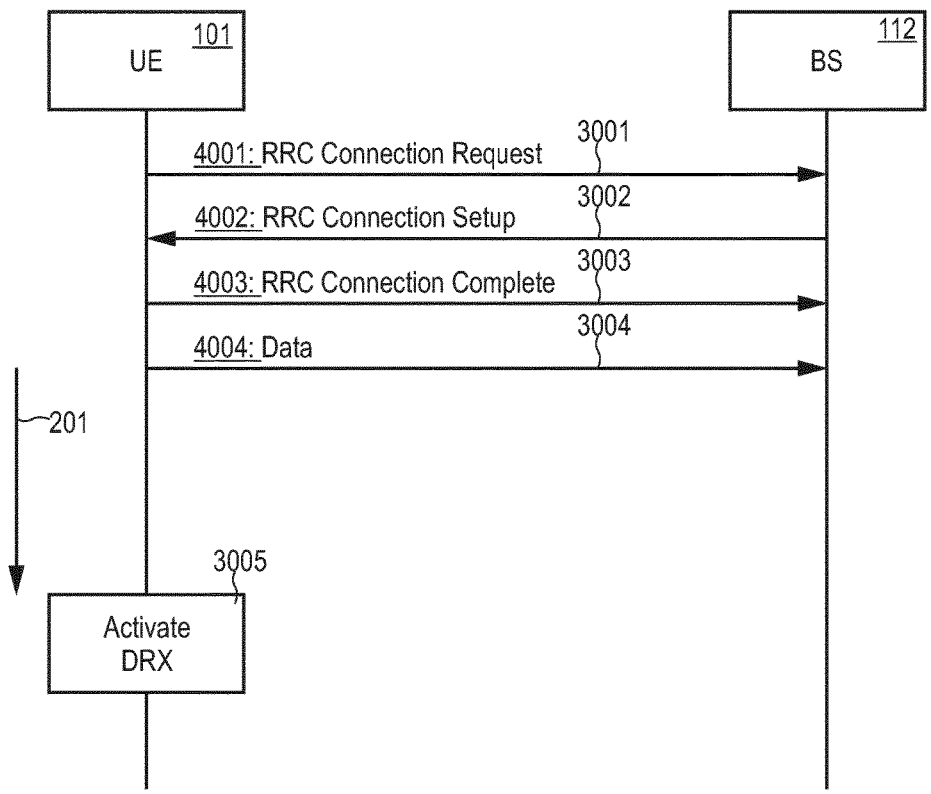
FIG. 5 is a signaling diagram schematically illustrating establishing a data connection for data communication on a wireless link according to reference implementations and further illustrates activating DRX according to reference implementations.

FIG. 5 illustrates aspects with respect to activation of DRX. Specifically, FIG. 5 illustrates activation of DRX according to a reference implementation. FIG. 5 is a signaling diagram of signaling between the UE 101 and the BS 112.

FIG. 5 illustrates establishment of the data connection 189. As such, FIG. 5 relates to a scenario in which the UE 101—upon establishment of the data connection 189—operates in connected mode. As described in connection with FIG. 4, set up/establishment of the data connection 189 is a functionality native to the RRC layer 255.

First, at 3001, the UE 101 transmits an RRC connection request message 4001. The UE 101, by means of this RRC control signaling, requests the establishment of the data connection 189. For example, the RRC connection Request 4001 could be transmitted in response to a random access procedure that may be triggered by paging (not illustrated in FIG. 5). For example, the RRC connection request message 4001 may include an identity of the UE 101. For example, the RRC connection request message 4001 may include an establishment cause.

Then, if the network 100 is willing to grant the request, at 3002, the BS 112 transmits—in response to the RRC connection request message 4001—a RRC connection set up message 4002. For example, a signaling radio bearer towards the AMF 131 may be indicated. Also, certain configuration parameters of the data connection 189 may be indicated, e.g., and configuration of the RLC layer 253, etc. . . .

Finally, at 3003, the UE 101—upon receiving of the RRC connection setup message 4002—transmits the RRC connection complete message 4003; then, the data connection 189 has been set up.

Then, the UE 101 and the BS 112 both participate in a data communication via the data connection 189, the UE by transmitting UL data 4004 and the BS 112 by receiving the UL data 4004.

As a general rule, while in FIG. 5 the specific scenario of an establishment of the data connection 189 has been illustrated, it would be possible to use RRC control signaling 4001-4003 to configure the data connection 189 on the wireless link 114 between the UE 101 and the network 100. Such configuring of the data connection 189 may include establishment of the data connection 189 (as illustrated in FIG. 5) and/or reconfiguring of a pre-established data connection 189 (not illustrated in FIG. 5).

In the scenario FIG. 5, upon transmitting the UL data 4004, there is no more UL data and/or DL data of the data communication queued for transmission in a respective transmit buffer of the UE 101 or the BS 112, respectively. According to the reference implementation illustrated in FIG. 5, hence, the UE 101 initializes an inactivity timer 201 and, upon expiry of the inactivity timer 201, activates DRX, at 3005. For example, it would be possible that the configuration of the inactivity timer 201 is implemented by the RRC control signaling, e.g., in form of the RRC connection setup message 4002. For example, a technique according to 3GPP TS 36.331 (Version 15.0.0), section 6.3 in combination with 3GPP TS 36.321 (Version 15.0.0) "drx-inactivitytimer" may be employed. Thus, the inactivity timer 201 may be configured using control signaling native to the RRC layer 255. To avoid premature activation of the DRX, the inactivity timer 201 is typically dimensioned around 10 ms-100 ms. For this time duration, a wireless interface of the UE continues to operate in an active state.

Then, activating the DRX at 3005 includes transitioning a wireless interface of the UE into an low-power state. Details with respect to the low-power state are also illustrated in connection with FIG. 6.

Figure 6:
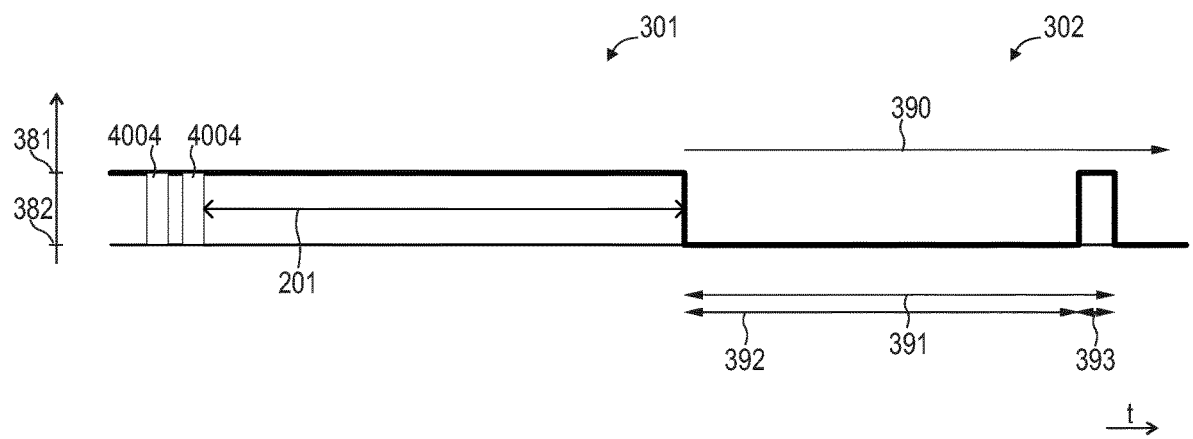
FIG. 6 schematically illustrates activating DRX according to reference implementations.

FIG. 6 illustrates aspects with respect to activating DRX 390. FIG. 6 illustrates activation of DRX 390 according to reference implementations.

As illustrated in FIG. 6, initially, the wireless interface of the UE 101 constantly operates in an active state 381. The wireless interface of the UE 101 is capable of receiving DL data and/or of transmitting UL data 4004 when operating in the active state 381. For example, the wireless interface may be fully powered up such that even high-constellation modulations can be demodulated for communicating the DL data and/or the UL data 4004. The active state 381 may be associated with a comparably high energy consumption.

Also illustrated in FIG. 6 is the inactivity timer 201 which is initialized upon completion of the transmission of the UL data 4004; then, the data connection 189 idles for the duration of the inactivity timer 201. Only upon expiry of the inactivity timer 201, the DRX 390 is activated. Upon activating the DRX 390, the wireless interface of the UE 101 is transitioned into an low-power state 382.

As a general rule, the low-power state 382 may be characterized by a reduced power consumption if compared to the active state 381. In FIG. 6, the vertical axis correlates with the power consumption at the UE 101. For example, certain hardware circuitry and/or software functionality of the wireless interface of the UE 101 may be shut down in the low-power state 382, while being activated in the active state 381. For example, the UE 101 may be unfit to receive at least some signals—e.g., signals of higher modulation order or using high constellations of the associated modulation which it could otherwise receive in the active state 381—when the wireless interface operates in the low-power state 382.

In the example of FIG. 6, the DRX 390 includes a DRX cycle including OFF durations 392 and ON durations 393 that are set in accordance with the timing of the DRX 390.

As will be appreciated from FIG. 6, the wireless interface of the UE 101 operates in the low-power state 382 during the OFF durations 392 and operates in the active state 381 during the ON durations 393. Also illustrated in FIG. 6 is the cycle length 391 of the cycle of the DRX 390. As a general rule, it is not required that the strictly periodic cycle is employed. More flexible timings e.g. using variable periodicity can be used. In the various examples described herein, such a DRX 390 including a cycle can be employed.

Throughout the entire operation illustrated in FIG. 6, the UE 101 operates in connected modes 301, 302. Hence, the data connection 189 is not released. For example, certain registry entries pertaining to the UE 101 may be maintained at the network 100, e.g., if the AMF 131 and/or the BS 112, even when activating the DRX 390. Details with respect to the various modes in which a UE 101 can operate in the various examples described herein are also illustrated in connection with FIG. 7.

Figure 7:
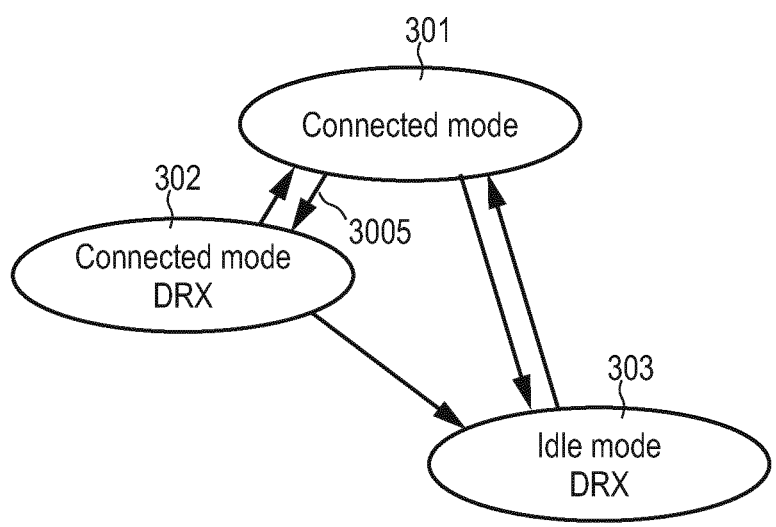
FIG. 7 schematically illustrates various modes in which a UE can be operated according to various examples.

FIG. 7 illustrates aspects with respect to different modes 301-303 in which the UE 101 can operate. Example implementations of the operational modes 301-303 are described, e.g., in 3GPP TS 38.300, e.g., version 15.0.

When operating in the connected mode 301, the data connection 189 is set up. For example, a default bearer and optionally one or more dedicated bearers may be set up between the UE 101 and the network 100. The wireless interface of the UE 101 may persistently operate in the active state 381.

In order to reduce the power consumption, it is then possible to transition from the connected mode 301 to a further connected mode 302 which employs the DRX 390 (sometimes referred to as connected mode DRX). This corresponds to activation 3005 of the DRX 390 (cf. FIGS. 5 and 6). The timing of the DRX 390 is synchronized between the UE 101 and the BS 112 such that the BS 112 can align any DL transmission with the ON durations 393 of the connected mode DRX 390. The data connection 189 is maintained set-up in connected mode DRX 302. Hence, the configuration of the data connection 189—e.g., set by the RRC control signals 4001-4005 (cf. FIG. 5) may be maintained.

To achieve a further power reduction, it is possible to implement an idle mode 303. The idle mode 303 is, again, associated with DRX of the wireless interface of the UE 101. However, during the ON durations of the DRX in idle mode 303, the wireless interface may only fit to receive paging indicators e.g., on the channel 262. For example, this may help to restrict the particular bandwidth that needs to be monitored by the wireless interface during the ON durations of the DRX in idle mode 303. This may help to further reduce the power consumption—e.g., if compared to the connected mode 302.

Figure 8:
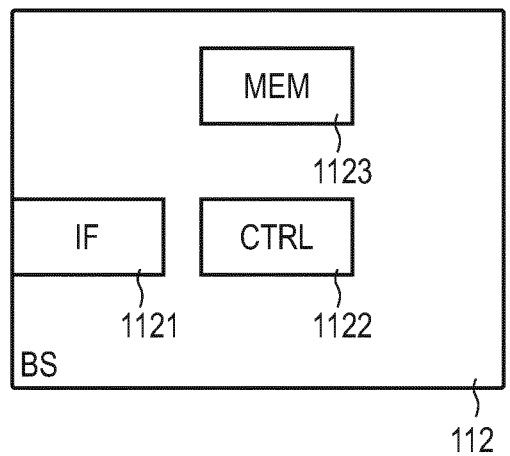
FIG. 8 schematically illustrates a base station (BS) according to various examples.

FIG. 8 schematically illustrates a BS 112 of the RAN 111 (cf. FIG. 1). The BS 112 includes a wireless interface 1121. For example, the wireless interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: configuring the data connection, including establishment and reconfiguration; participating in data communication via the data connection 189; and activating the DRX 390 using lower-layer control signaling.

Figure 9:
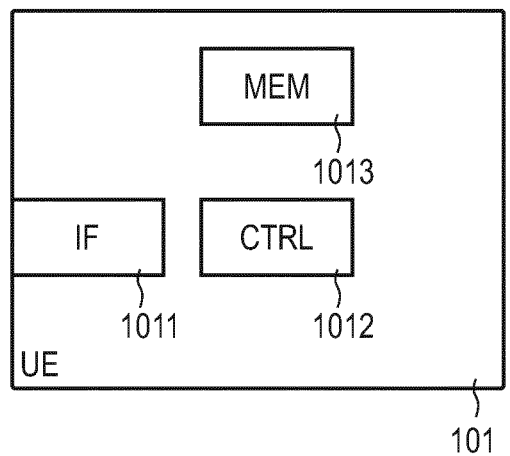
FIG. 9 schematically illustrates a UE according to various examples.

FIG. 9 schematically illustrates the UE 101. The UE 101 includes a wireless interface 1011. For example, the wireless interface 1011 may include an analog front end and a digital front end. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: configuring the data connection, including establishment and reconfiguration; participating in data communication via the data connection 189; and activating the DRX 390 using lower-layer control signaling.

Figure 10:
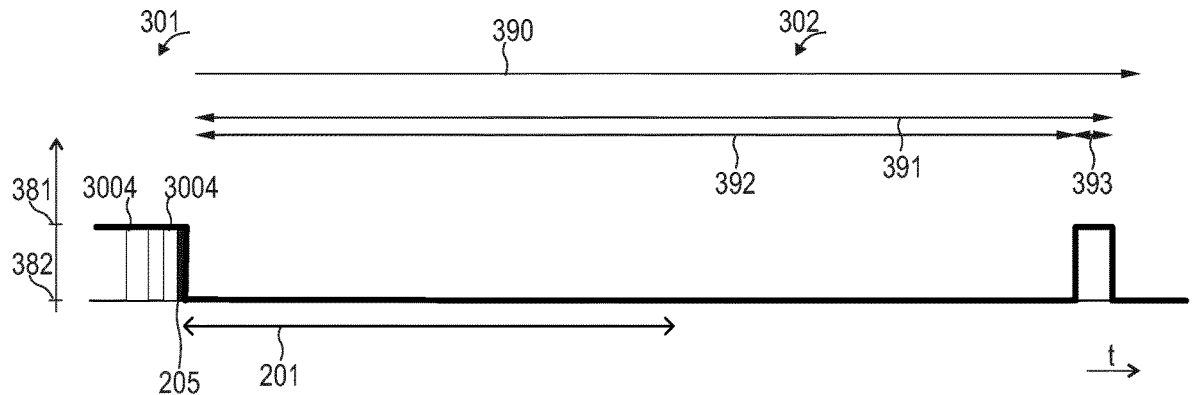
FIG. 10 schematically illustrates activating DRX according to various examples.

FIG. 10 illustrates aspects with respect to activating the DRX 390. In the scenario of FIG. 10, a control signal 205 native to the PHY layer 251 (hereinafter, also simply referred to as PHY control signal) is transmitted by the BS 112 and received by the UE 101.

The BS 112 and the UE 101, in response to communicating the PHY control signal 205, activate the DRX 390 for the data communication via the data connection 189. Hence, the data connection 189 is not released throughout the scenario illustrated in FIG. 10 and, as such, the UE 101 operates in connected modes 301, 302.

The PHY control signal 205 may include an explicit or implicit command to activate the DRX 390. For example, a 1-bit flag may implement the command.

Also in the example of FIG. 10, the DRX 390 includes a DRX cycle including the OFF durations 392 and the ON durations 393, defined in accordance with a timing of the DRX 390.

In the example of FIG. 10, the inactivity timer 201 is completely skipped (as is apparent from a comparison of FIGS. 6 and 10); as a general rule, it would be possible to at least partly override the inactivity timer 201. At least partly overriding the inactivity timer 201 may be implemented by completely skipping the inactivity timer 201 or early termination of the inactivity timer 201.

From a comparison of FIG. 10 with FIG. 6 it follows that the time during which the wireless interface 1011 of the UE 101 operates in the active state 381 is shortened by using the PHY control signal 205. This may be labelled early activation of DRX. Early activation of DRX reduces the energy consumption at the UE 101. Such early activation of the DRX 390 helps the UE 101 to avoid semi-static RRC-based connected DRX; rather, by means of the PHY control signal 205 it can be dynamically control how often the UE listens for further data scheduling on the PDCCH 263.

Specifically, the functionality of early activation of the DRX 390 by means of the PHY control signal 205 helps to reduce the time during which the UE 101 is required to monitor the PDCCH channel 263. Namely, in response to activating the DRX 390, the monitoring of the PDCCH associated with the data connection 189, e.g., for scheduling information signals such as DCI, is suspended. Monitoring the PDCCH may include blind decoding of signals; this blind decoding can be energy expensive and require a high computational load. Thus, shortening the time to monitor the PDCCH may reduce the power consumption.

As a general rule, various implementations for the PHY control signal to trigger activation of the DRX, i.e., for early DRX activation, are conceivable. For example, a dedicated type of control signal may be used. Alternatively, existing control signals within the 3GPP framework may be reused, e.g., a certain DCI type may be used as the PHY control signal 205.

Figure 11:
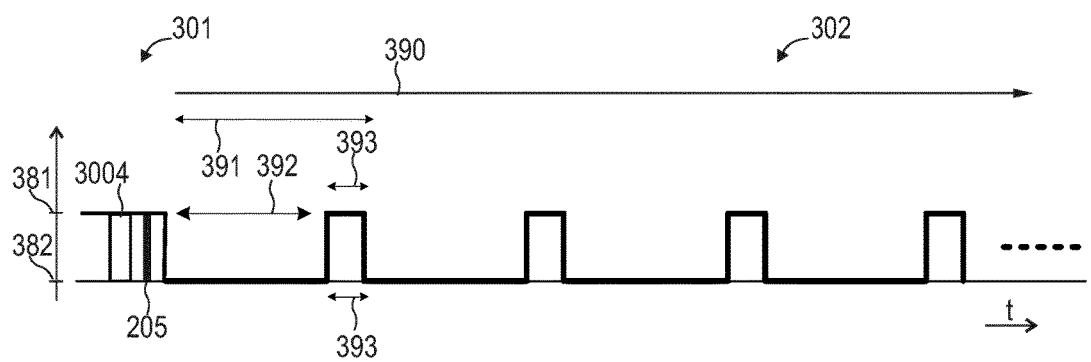
FIG. 11 schematically illustrates activating DRX according to various examples.
Figure 12:
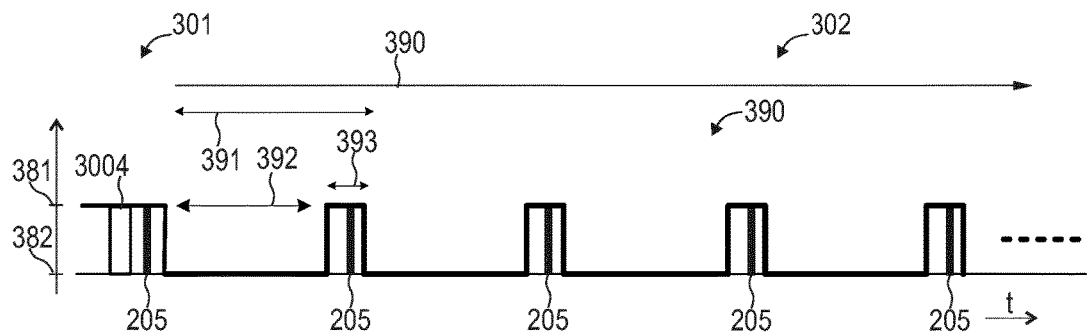
FIG. 12 schematically illustrates activating DRX according to various examples.

In the example of FIG. 10, the PHY control signal 205 is used to activate the DRX 390; in case of a DRX 390 using a cycle, the temporal validity of the PHY control signal 205 may cover a single OFF duration 392 or multiple OFF durations 392. In some scenarios the PHY control signal 205 may be valid for an extended time duration covering multiple cycles of the DRX 390, as illustrated in FIG. 11. In other examples, the PHY control signal 205 may be repeated each ON duration 393 of the cycle of the DRX 390, as illustrated in FIG. 12. Hence, as illustrated in the scenario of FIG. 12, the temporal validity of the PHY control signal 205 may cover a single of duration 392, only. Then, the multiple repetitions of the PHY control signal 205 may be used.

As a general rule, as illustrated in FIG. 12, the PHY control signal 205 may not only be used to initially activate the DRX 390, but may also be used to continue activation of the DRX 390.

In FIG. 10—as already described in connection with FIG. 6—the data connection 189 is maintained while the DRX 390 is active, i.e., the UE 101 operates in connected mode DRX 302. Upon activating the DRX 390, the wireless interface 1011 of the UE 101 is temporarily transitioned into the low-power state 382, during the OFF durations 392.

Above techniques are described to activate the DRX 390. Next, techniques are described to configure the DRX 390.

As a general rule, in the various examples described herein, the PHY control signal 205 may or may not be indicative of a configuration of the DRX 390. Specifically, in the various examples described herein, the PHY control signal 205 may or may not be indicative of the timing of the DRX 390 to be activated.

As a general rule, RRC control signaling may be used—sometimes in addition to the PHY control signal 205—to configure the configuration of the DRX 390, e.g., the timing of the DRX 390. For example, the RRC connection setup message 4002 or an RRC reconfiguration message may be used to, at least partly, configure the timing of the DRX 390. In such scenarios using an RRC control signal, the timing of the DRX 390 is pre-configured, i.e., configured prior to activation by means of the PHY control signal 205.

In some examples, it is possible to configure the timing using, both the PHY control signal 205 and one or more RRC control signals.

For example, the timing of the DRX 390 may specify the length of the OFF duration 392 of a respective cycle. During the OFF duration 392, the UE 101 is not required to monitor for data on the PDCCH 263 or on the PDSCH 264. The wireless interface 1011 can be transitioned into the low-power state 382. As a further example, the timing may specify the length ON duration 391 of a respective cycle. During the ON duration 391, the UE 101 may be required to monitor the PDCCH 293 and/or the PDSCH 294. For this, the wireless interface 1011 of the UE 101 may be transitioned into the active state 381. Alternatively or additionally, the timing may specify a duty cycle of the ON duration 391 and the OFF duration 392. Alternatively or additionally, the timing may specify a cycle length 391. Alternatively or additionally, the timing may specify an overall duration of the DRX 390. Hence, the time duration during which the UE is still operate in the connected mode 302 may be specified by the timing of the DRX 390. In other words, the timing of the DRX 390 may specify a timer after which the UE 101 switches operation in the idle mode 303 (cf. FIG. 7). It would be possible that this time duration is expressed in terms of a number of cycles of the cyclic DRX 390. This is optional; in other scenarios, a specific RRC control signal or another specific PHY control signal may be transmitted to transition the UE 101 into idle mode 303.

As a general rule, various trigger criteria are conceivable to transmit the PHY control signal 205. For example, the BS 112 may monitor the traffic of the data communication via the data connection 189 and then selectively transmit the PHY control signal 205 depending on said monitoring of the traffic. Thereby, it becomes possible to tailor the timing of the DRX 390 depending on the traffic type. Other example trigger criteria include: congestion level at the BS 112; one or more requests from the UE 101; mobility level of the UE 101; buffer status reports from the UE etc.

Figure 13:
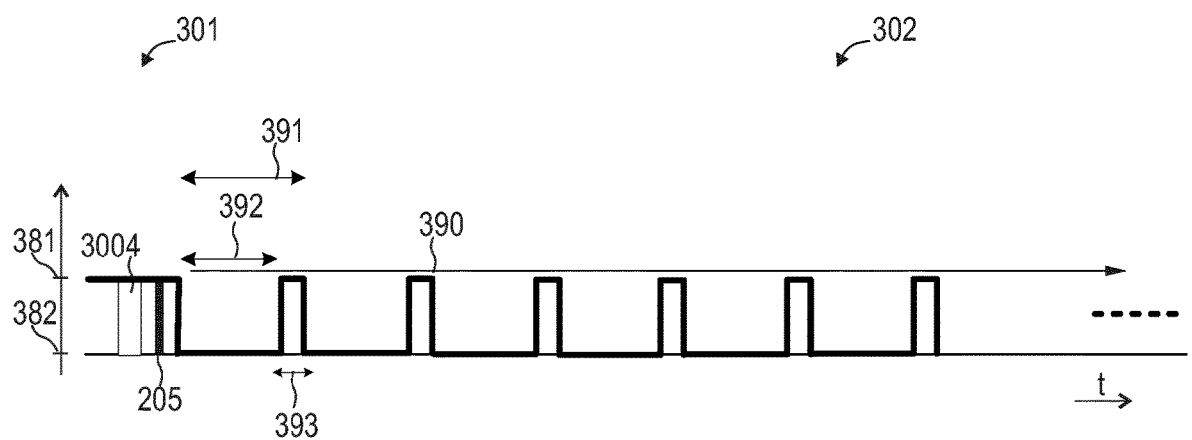
FIG. 13 schematically illustrates activating DRX according to various examples.
Figure 14:
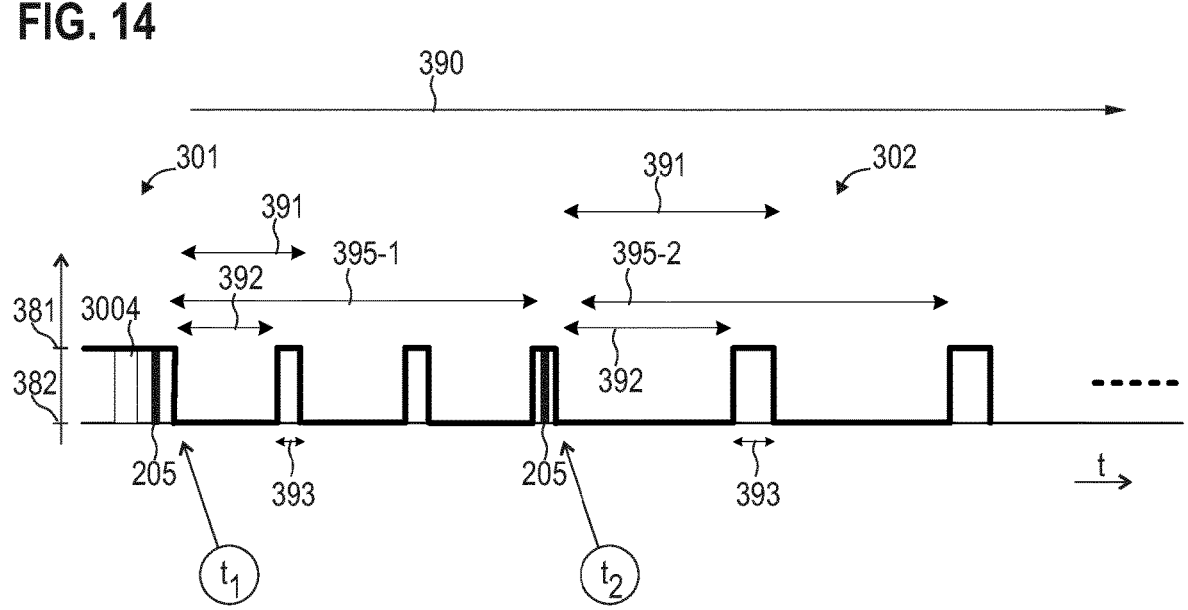
FIG. 14 schematically illustrates activating DRX according to various examples.

FIGS. 13 and 14 illustrate examples of how the PHY control signal 205 can be used to configure the timing of the DRX 390. For example, from a comparison of FIG. 13 with FIG. 12 it follows that by appropriately setting one or more indicators in the PHY control signal 205, the cycle length 391 of the cyclic DRX 390 can be tailored (FIG. 13 illustrates a shorter cycle length 391, while FIG. 12 illustrates a longer cycle length 391).

Further, in the example of FIG. 14, the temporal validity of the PHY control signal 205 includes three OFF durations 392 of the cycle of the DRX 390. The DRX 390 is activated at t1; then, at t2, after the three OFF durations 392, the PHY control signal 205 is re-sent. Here, the first instance of the PHY control signal 205 at t1 implements a first configuration 395-1 of the timing of the DRX 390; while the second instance of the PHY control signal 205 at t2 implements a second configuration 395-2 of the timing of the DRX 390. Specifically, the second configuration 395-2 of the timing is associated with an increased cycle length 391 if compared to the first configuration 395-1 of the timing. Thus, by using the PHY control signal 205, the timing of the DRX 390 can be flexibly adjusted.

As already mentioned above, instead of implementing the PHY control signal 205 to be indicative of the timing of the DRX 390, it would also be possible to—at least partly—configure the timing of the DRX 390 using RRC control signals, e.g., the RRC connection setup message 4002 (cf. FIG. 5). Thereby, the length of the PHY control signal 205 can be kept small. For example, the information content of the PHY control signal 205 may be limited to the command to activate that DRX 390, i.e., to transition the wireless interface 1011 to the low-power state 382. The UE 101 may then implement the DRX 390 in accordance with the RRC configuration that may be predefined according to our to RRC control signaling.

Figure 15:
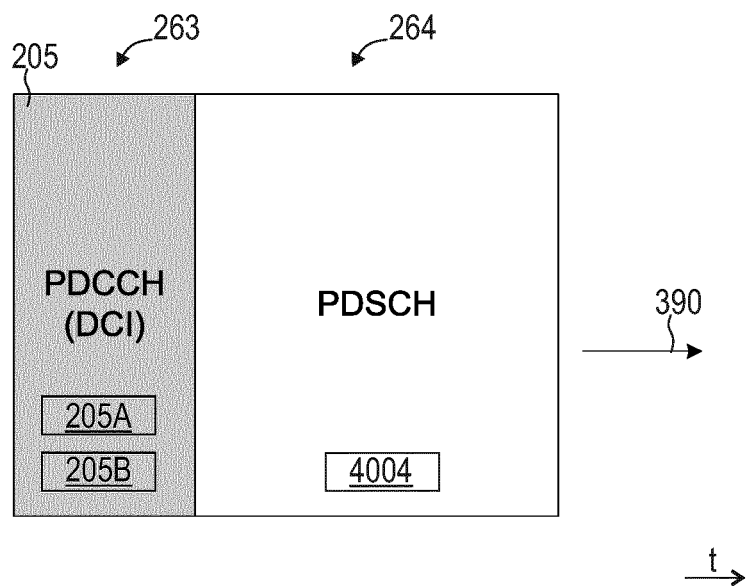
FIG. 15 schematically illustrates a control signal triggering activation of DRX according to various examples.

FIG. 15 illustrates aspects with respect to an example implementation of the PHY control signal. In the example of FIG. 15, the PHY control signal 205 is implemented as DCI. Specifically, the PHY control signal 205 includes, both, a command 205A to activate the DRX 390, as well as scheduling information 205B. The scheduling information 205B implements an indication of resources 265, 266 (cf. FIG. 2) allocated to the data communication on the data connection 189. In case of DL transmission, the data is then communicated on the PDSCH 264 in accordance with these scheduled resources 265, 266. Thereby, the control signaling overhead can be reduced. An alternative example is illustrated in FIG. 16.

Figure 16:
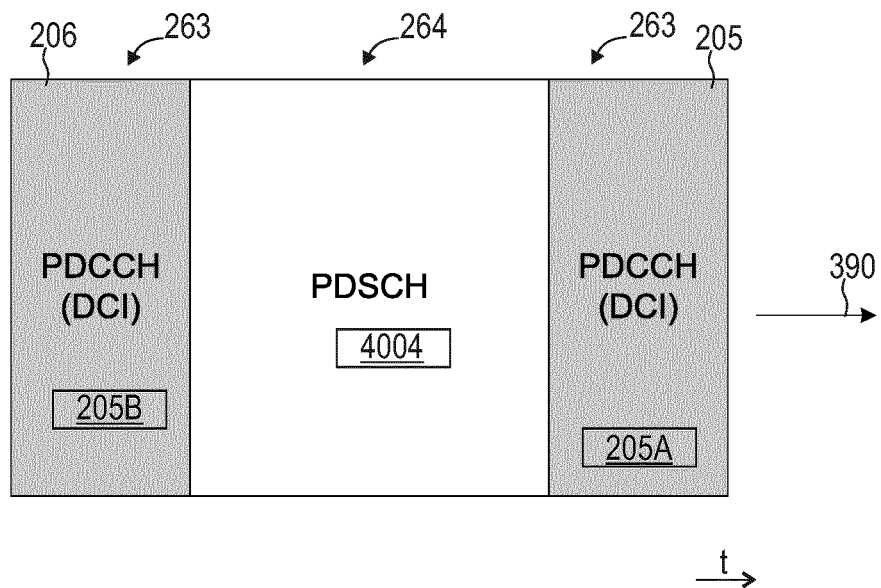
FIG. 16 schematically illustrates a control signal triggering activation of DRX according to various examples.

FIG. 16 illustrates aspects with respect to an example implementation of the PHY control signal 205. In the example of FIG. 16, the PHY control signal 205 is again implemented as DCI. However, the PHY control signal 205 is transmitted after completion of the data communication via the data connection 189, i.e., the communication of UL data 4004 on the PDSCH 264. The DCI 206 including scheduling information 206 is transmitted separately, prior to the data communication on the PDSCH 264.

Thus, as will be appreciated from a comparison of FIGS. 15 and 16, the PHY control signal 205 can be flexibly arranged in the data stream. For example, the PHY control signal 205 to activate the DRX 390 can be transmitted in combination with scheduling information (cf. FIG. 15) or separate from the scheduling information 206 (cf. FIG. 16). The PHY control signal 205 to activate the DRX 390 may be transmitted immediately after the data communication on the data connection 189 (cf. FIG. 16). The size of the PHY control signal 205 may be smaller than the size of the scheduling information 206.

Figure 17:
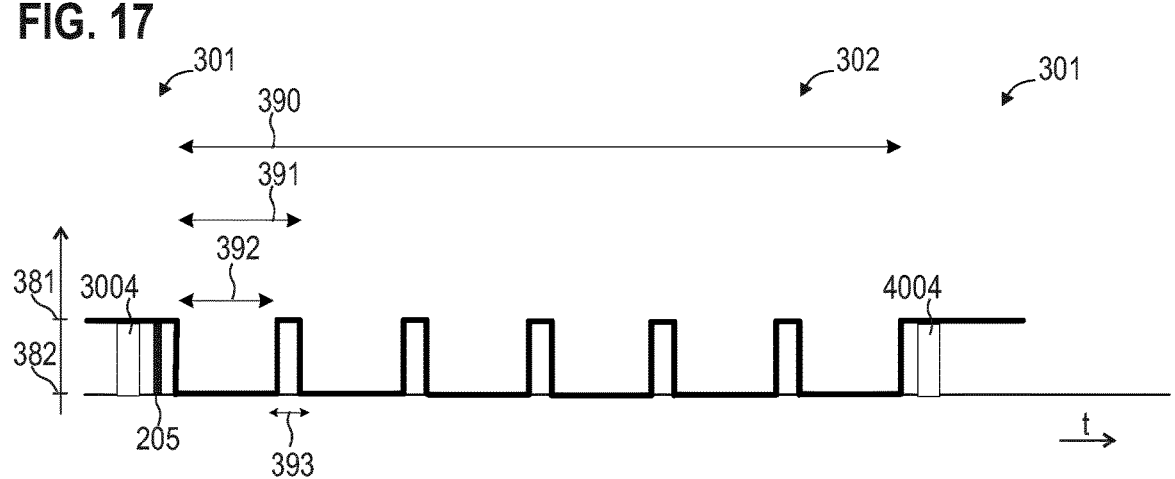
FIG. 17 schematically illustrates deactivating DRX according to various examples.

FIG. 17 illustrates aspects with respect to deactivating the DRX 390. In the example of FIG. 17, after a while, UL data 4004 and/or DL data (not illustrated in FIG. 15) is communicated during an ON duration 393 of the DRX 390. This triggers a transition of the operation of the UE back to the connected mode 301.

As will be appreciated, throughout the operation illustrated in FIG. 17, the data connection 189 is maintained. I.e., upon deactivating the DRX 390, it is not required to re-establish the data connection. Random access is dispensable. The RRC connection request message 4001 and the RRC connection setup message 4002 (cf. FIG. 5) are dispensable. Thus, in response to deactivating the DRX 390, it is possible to commence participating in the data communication of the data connection 189 based on a configuration thereof maintained while the DRX 390 is active. This reduces the latency between arrival of the data of the data communication in a transmit buffer and until communication of the data.

Figure 18:
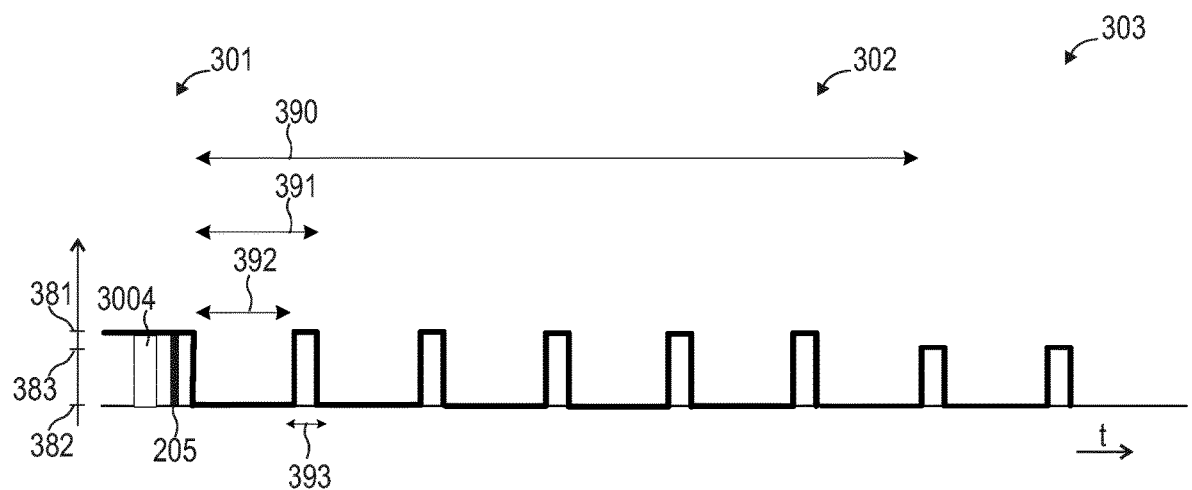
FIG. 18 schematically illustrates deactivating DRX according to various examples.

FIG. 18 illustrates aspects with respect to deactivating the DRX 390. In the example of FIG. 18, after a certain time duration—e.g., upon expiry of a timer or after a certain count of OFF durations 392—the UE 101 continues to operate in the idle DRX mode 303 (cf. FIG. 7). Here, the wireless interface 1011 of the UE 101 operates in an low-power state 383 during the respective ON durations of the corresponding DRX in which the UE 101 is fit to receive paging signals.

Figure 19:
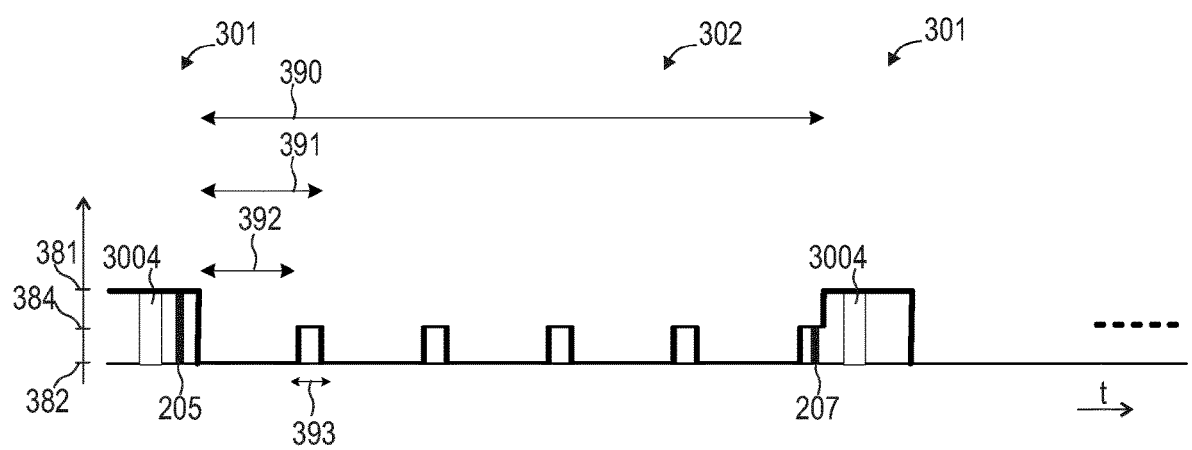
FIG. 19 schematically illustrates deactivating DRX according to various examples.

FIG. 19 illustrates aspects with respect to deactivating the DRX 390. During the respective ON durations 393 of the cyclic DRX 390, the wireless interface 1011 of the UE 101 does not operate in the active state 381. Rather, the wireless interface 1011, during the ON durations 393, operates in an low-power state 384. The functionality of the wireless interface 1011 is restricted to receiving wake-up signals (WUSs) during the low-power state 384.

A WUS 207 is received during one of the ON durations 393; in response to receiving the WUS 207, the DRX 390 is deactivated and operation in the connected mode 301 commences. This goes along with transitioning the wireless interface 1011 to operate in the active state 381. As will be appreciated, the DRX 390 is deactivated in response to receiving the WUS 207.

As a general rule, the PHY control signal 205 may be employed to activate or deactivate use of WUSs 207 for deactivating the DRX 390. Alternatively or additionally, it would be possible to employ RRC control signaling to set whether or not to use the WUSs 207 for deactivating the DRX 390.

The WUS 207 enables to UE 101 to transition the wireless interface 1011 of the UE 101 into a low-power state, e.g., for power-saving purposes. For example, the WUS 207 may be received by a dedicated low-power receiver of the UE; then a main receiver of the wireless interface 1011 may be completely shut down in the low-power state 284. In other examples, the WUS 207 may be received by a main receiver of the wireless interface 1011 in a low-power state. Here, it may not be required to provision a dedicated low-power receiver. The low-power receiver and main receiver may be implemented within the same hardware component(s) or may be implemented by at least one different hardware component.

The low-power state 384 can be characterized by a significantly reduced power consumption if compared to an active state 381. For example, the wireless interface 1011 may be unfit to receive any data in the low-power state 384 such that some or all components may be shut down. Wake-up from the low-power state 384 is then triggered by the WUS 207.

The WUS 207 may have a comparably simple modulation, e.g., On-Off Keying or the like, which facilitates a simple time-domain operation by the low-power receiver. For example, non-coherent decoding may be possible. For non-coherent decoding, knowledge of a reference phase is not required for signal detection. The WUS 207 may help to avoid blind decoding of the PDCCH 263, even during the ON durations 393. Since typically such blind decoding is comparably energy inefficient, thereby, power consumption can be reduced by using WUSs 207.

In the various examples described herein, time-domain and/or frequency-domain processing is employed to identify the WUS 207. Sometimes, respective processing may be with respect to a symbol sequence. Alternatively or additionally, respective processing may be with respect to a bit sequence. For example, processing may be with respect to a symbol sequence if the processing—e.g., correlation—is at the Fast Fourier Transform (FFT) output of the receiver. For example, processing may be with respect to a bit sequence if the processing—e.g., correlation—is after the demodulation output, e.g., after OOK, M-QAM or PSK output.

The processing of the WUS 207 by a digital front end of the wireless interface 1011 may be comparably simple—e.g., if compared to processing of a paging indicator. In legacy LTE, once the UE is scheduled a PO, i.e., allocated to listen to a paging indicator, the UE is expected to be ready to decode the PDCCH 263. Thus, the paging signal may include a temporary identity such as the P-RNTI and a PDCCH checksum which is scrambled with P-RNTI. The paging indicator may be transmitted on the PDCCH. The PDCCH computation can be energy consuming, especially in MTC.

Differently, the WUS 207 may be transmitted independent of the PDCCH. Once the UE has detected a WUS 207, then the UE may start to decode the PDCCH 263. For example, the WUS 207 may be transmitted on a different carrier than the PDCCH 263.

The WUS 207 may not include reference to the P-RNTI—included in the paging signal—for UE-specific identification. The WUS 207 may be designed so that it requires less UE computation/calculation than reception and decoding of the paging signal.

For example, with respect to the WUS 207, it may not be preferred to have channel coding such as turbo code, convolutional code, etc. The WUS 207 can be a robust signal, such that it does not operate with higher order modulation. It can be a lower order modulation, such as On-Of-Keying (OOK), BPSK. The WUS 207 may employ a modulation scheme that has low peak to average power ratio property. The WUS 207, specifically a part of the WUS related to a UE, can be a random bits and/or sequence signal that can be unique that can be assigned to a UE or group of UEs.

Irrespective of whether the active state 381 is activated during the ON durations 393 of the cycle of the DRX 390 or whether the low-power state 384 is activated (cf. FIG. 15 versus FIG. 19), the configuration of the data connection 189 can be maintained during the connected mode 302 and the data communication via the data connection 189 upon deactivating the DRX 390 can commence based on the maintained configuration.

Figure 20:
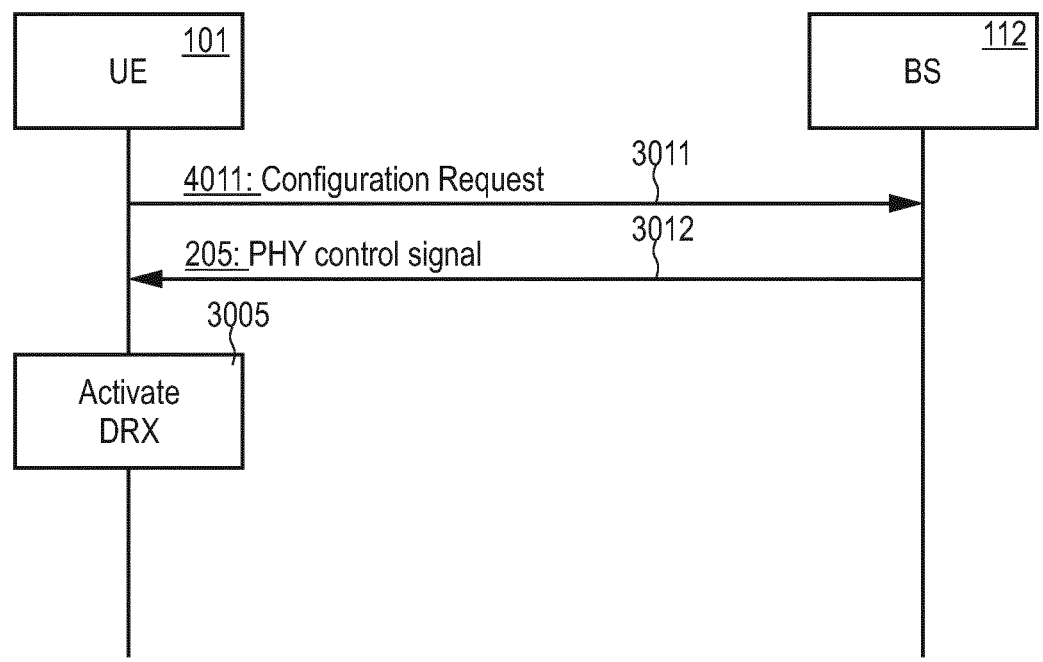
FIG. 20 is a signaling diagram illustrating communication between a UE and a BS according to various examples, wherein communication includes a control signal for triggering activation of DRX according to various examples.

FIG. 20 illustrates aspects with respect to configuration of the DRX 390 based on the PHY control signal 205.

Optionally, at 3011, the UE 101 transmits in UL control signal 4011 indicative of requested timing 391-393 for the DRX 390. In some examples, the UL control signal may be native to the PHY layer 251; in alternative examples, the UL control signal 4011 may be native to the RRC layer 255 (cf. FIG. 4). If the UL control signal 4011 is native to the PHY layer 251, a low-latency request for a timing configuration can be implemented, e.g., within the same subframe 267 also including the PHY control signal 205 communicated at 3012. This can facilitate a low-latency closed-loop control of the timing of the DRX 390, activated at 3005. If the UL control signal is implemented native to the RRC layer 255, generally, there may be a tendency that it is possible to include more information, at the cost of increased latency. Sometimes, such an increased latency may be acceptable, e.g., where the timing is requested by means of the UL control signal 4011 based on a slowly-changing state of charge battery level of the battery of the UE 101.

The BS 112 may take into consideration the traffic of the data communication via the data connection 189 when deciding whether to transmit or not to transmit the PHY control signal 205 at 3012.

The PHY control signal 205 may act as a grant to the requested timing; the PHY control signal 205 may also adjust the requested timing.

Figure 21:
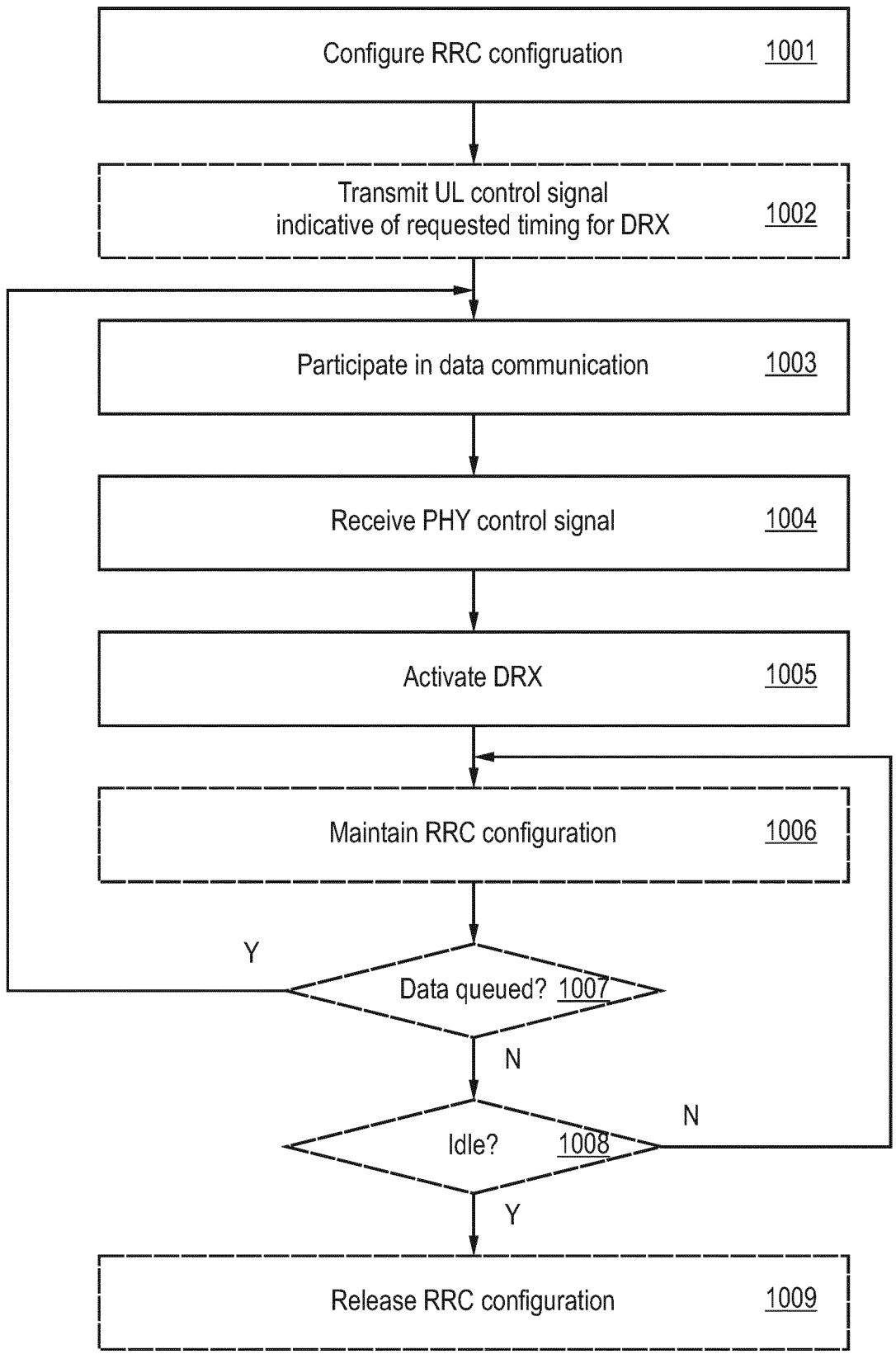
FIG. 21 is a flowchart of a method according to various examples.

FIG. 21 is a flowchart of an example method. For example, the method of FIG. 21 may be executed by the control circuitry 1012 of the UE 101, e.g., upon receiving the respective program code from the memory 1013.

At block 1011, a data connection on a wireless link between a terminal device and the network is configured. For this, RRC control signaling may be implemented (cf. FIG. 4 where the RRC layer 255 is illustrated and FIG. 5 where the RRC control signaling 4001-4003 is illustrated).

Next, at optional block 1002, an UL control signal is transmitted which is indicative of a requested timing for a DRX. For example, the UL control signal may be native to the same layer as the control signal used for configuring the data connection at block 1008; or may be native to a lower layer of the transmission protocol stack. For example, a UL control signal native to the PHY layer may be used (cf. FIG. 4 where the PHY layer 251, lowest in hierarchy of the transmission protocol stack 250, is illustrated). For example, it would be possible to request a timing based on a battery status or specifically a state of charge of the battery of the corresponding UE. As a general rule, other decision criteria can be taken into account, e.g., application identifications of applications executed by the UE, a quality of service level of the subscription of the user associated with the UE, etc.

Next, at block 1003, the UE participates in the data communication via the data connection that has been established in block 1001. Participating in the data communication in block 1003 can include transmitting UL data and/or receiving (communicating) DL data.

Next, at block 1004, a control signal native to a lower layer of the transmission protocol stack if compared to the layer of the transmission protocol stack to which the control signal used for configuring the data connection 1001 is native, is received. For example, a control signal native to the PHY layer can be received at block 1004.

Then, in response to receiving the PHY control signal at block 1004, the DRX is activated in 1005. In particular, a latency between executing 1004 and 1005 can be comparably short, e.g., shorter than a typical latency associated with RRC control signaling. The latency may be on the order of 1-10 ms.

At optional block 1006, the configuration of the data connection setup at block 1001 is maintained. For example, one or more respective configuration parameters may be maintained in a memory of the UE.

At block 1007, it is checked whether the data of the data communication via the data connection is queued for transmission. Different implementations of block 1007 are conceivable. For example, a control channel may be monitored for a scheduling information, e.g., PDCCH may be monitored (cf. FIG. 3 where the PDCCH 263 is illustrated and cf. FIG. 17). In an alternative scenario, a wake-up control channel may be monitored for any WUS (cf. FIG. 19).

If there is data queued for transmission, then block 1003 is re-executed; i.e., the UE participates in the data communication via the data connection. For this, the configuration of the data connection maintained at block 1006 may be reused. It is not required to set up another data connection.

Hence, in other words, throughout the blocks 1001-1007, the UE may continuously operate in a connected mode using DRX.

However, if no data is queued in block 1007, then at block 1008 is this checked whether the UE should continue to operate in an idle mode. For example, respective timer may be implemented. If the timer has not expired or another decision criteria on indicates that the UE should continue to operate in connected mode using DRX, then block 1006 is re-executed; i.e., the configuration of the data connection as set up in block 1001 is maintained. Otherwise, at block 1009, this configuration of the data connection is released. The UE continues to operate in idle mode (cf. FIG. 7 where the IMO 303 is illustrated).

Figure 22:
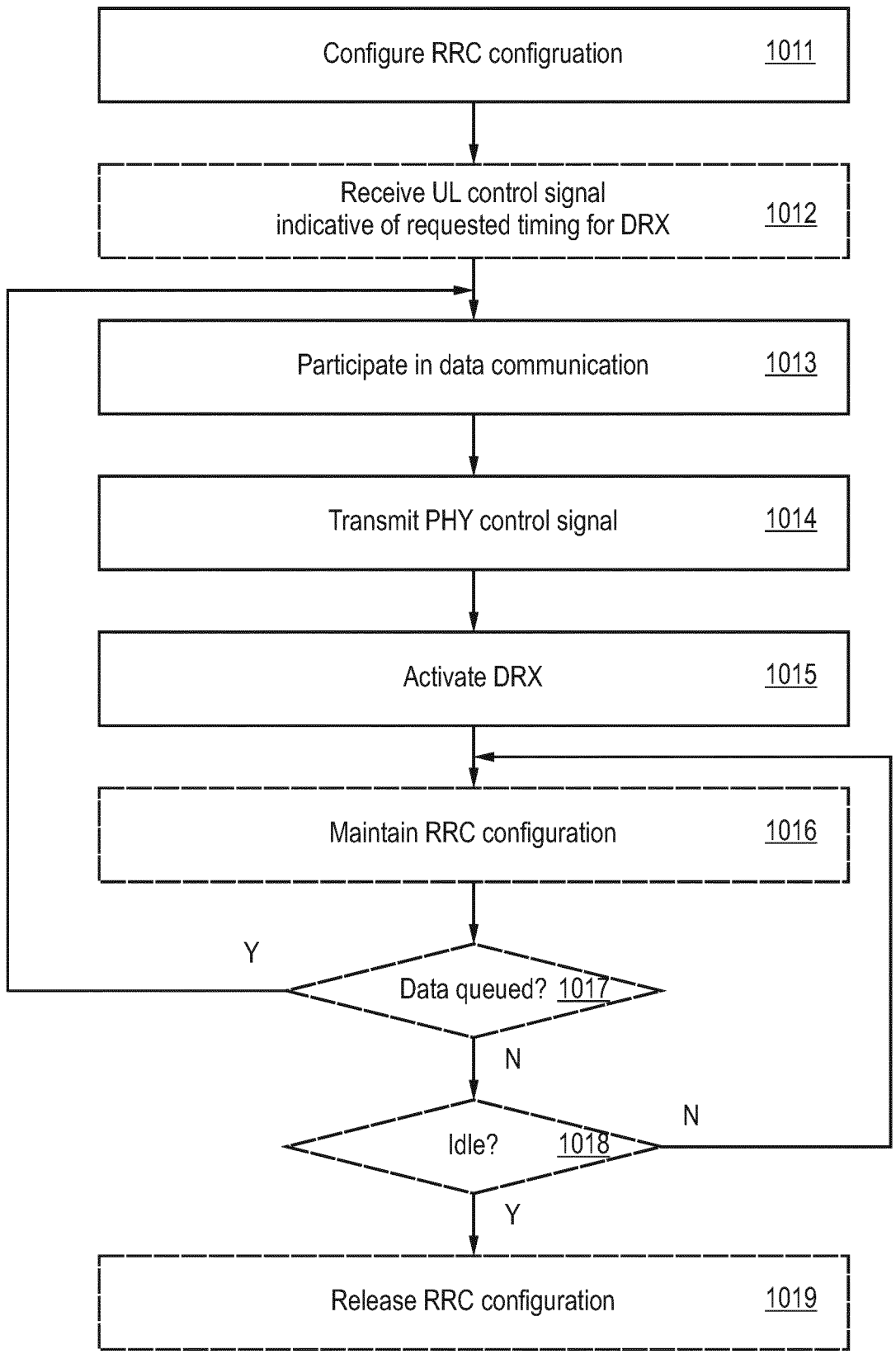
FIG. 22 is a flowchart of a method according to various examples.

FIG. 22 is a flowchart of an example method. For example, the method of FIG. 22 may be executed by the control circuitry 1112 of the BS 112, e.g., upon receiving program code from the memory 1123.

1011 is inter-related with 1001.
1012 is inter-related with 1002.
1013 is inter-related with 1003.
1014 is inter-related with 1004. For example, in deciding whether to transmit or not to transmit the PHY control signal at 1014, the BS 112 may take into account a result of monitoring traffic off the data communication via the data connection configured at block 1011. For example, the PHY control signal may be selectively transmitted for certain traffic types. For example, depending on the quality of service associated with the traffic type, the PHY control signal may be transmitted faster or slower.
1015 is inter-related with 1005.
1016 is inter-related with 1006.
1017 is inter-related with 1007.
1018 is inter-related with 1008.
1019 is inter-related with 1009.

Summarizing, above, techniques of early activation of DRX and dynamic configuration of DRX have been illustrated. These techniques can be applied during connected mode in which a configuration for a data connection is maintained. Optionally, wake-up signals can be employed to deactivate the DRX.

According to examples, a DL control signal native to a lower layer-such as the PHY layer of a transmission protocol stack—can be used to trigger the activation of the DRX.

This functionality helps to implement a dynamic control of the PDCCH monitoring of the UE during connected mode. This control of the monitoring can be done per-UE by the BS. The network can abort the monitoring with low latency, e.g., taking into account the current traffic pattern of the data communication via the data connection.

Thereby, a significantly more tailored UE receiver activity can be achieved, e.g., depending on the traffic pattern of each UEs; this particular is true if compared to conventional RRC control signaling used for configuring and activating the DRX. Idling of the UE while monitoring the PDCCH can be reduced or even removed completely.

As has been explained above, optionally, the UE may indicate to the BS a preferred timing of the DRX, e.g., using UL control signaling, e.g., native to the RRC layer or the PHY layer. Control signaling on the PUCCH can be used. This request for a certain timing can be based on the UE battery power condition. For example, a UE with a small remaining state of charge of the battery—e.g., 25% remaining battery—could indicate the UE preference of the DRX configuration with longer DRX opportunity, i.e., longer OFF durations in short the ON durations.

Further, as an additional function, WUS techniques may be employed. Here, the UE would not be required to listen for ordinary PDCCH signaling during the monitoring in ON durations of a cycle of the DRX; rather, the UE can be configured to listen for WUSs. Thereby, the wireless interface of the UE can be operated in an low-power state even during the ON durations; instead of listening on the PDCCH. The PHY control signal can be indicative of the use of the WUS. Alternatively, it would also be possible that the user wake-up signal is configured by RRC control signaling, e.g., the UE-specific; or on cell level e.g., using system information that is broadcasted.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various examples have been described in which a PHY control signal is used to trigger early activation of DRX. In other examples, a MAC or RLC control signal may be used to trigger early activation of DRX. Since also these layers are below the RRC layer, the effect of reduced latency may be achieved.

For further illustration, above, various scenarios have been described in which a WUS is used to deactivate the DRX. In other examples, a paging indicator communicated on PDCCH may be used.

The invention claimed is:

1. A method of operating a terminal device, comprising:
configuring a data connection on a wireless link between the terminal device and a network based on a first control signal native to a first layer of a transmission protocol stack associated with the wireless link,
participating in a data communication via the data connection,
receiving a second control signal native to a second layer of the transmission protocol stack, the second layer being arranged lower in hierarchy of the transmission protocol stack than the first layer,
in response to receiving the second control signal: activating a connected mode discontinuous reception for the data communication, and
during the connected mode discontinuous reception, suspending monitoring a downlink control channel, wherein the data connection and a configuration for the data connection set by RRC control signaling are maintained during the connected mode discontinuous reception,
wherein the second layer is implemented by the Physical Layer of the transmission protocol stack,
wherein the connected mode discontinuous reception activated in response to the second control signal has a temporal validity, and
wherein the second control signal is indicative of a timing of the discontinuous reception.

2. The method of claim 1,
wherein the first layer is implemented by the Network Layer of the transmission protocol stack.

3. The method of claim 1,
wherein the discontinuous reception has an at least partly pre-configured timing.

4. The method of claim 3,
wherein the timing of the discontinuous reception is at least partly pre-configured by one or more third control signals native to the first layer of the transmission protocol stack.

5. The method of claim 1,
wherein the second control signal is indicative of a command to activate the discontinuous reception and optionally indicative of scheduling information for resources allocated for the data communication on the data connection.

6. The method of claim 1,
wherein one or more third control signals are indicative of a configuration of an inactivity timer for activating the discontinuous reception if the data communication idles,
wherein the discontinuous reception is activated in response to receiving the second control signal by at least partly overriding the inactivity timer.

7. The method of claim 1, further comprising:
transmitting an uplink control signal indicative of a requested timing for the discontinuous reception.

8. The method of claim 7, further comprising:
determining the requested timing based on a state of charge of a battery of the terminal device.

9. The method of claim 1, further comprising:
deactivating the discontinuous reception, and
in response to said deactivating of the discontinuous reception: commencing said participating in the data communication of the data connection based on the maintained configuration.

10. The method of claim 1, further comprising:
while the discontinuous reception is active: receiving a wake-up signal,
wherein the discontinuous reception is deactivated in response to said receiving of the wake-up signal, and
wherein at least one of the second control signal is indicative of use of the wake-up signal, or at least one of the first control signal and a third control signal native to the first layer is indicative of use of the wake-up signal.

11. The method of claim 1, further comprising:
wherein suspending monitoring the downlink control channel includes suspending monitoring for a scheduling information signal indicative of resources allocated to data of the data communication.

12. The method of claim 1,
wherein said participating in the communication of the data communication comprises controlling a wireless interface of the terminal device to transmit or receive,
wherein said implementing of the discontinuous reception comprises at least temporarily transitioning the wireless interface of the terminal device into an low-power state in which it is unfit to receive at least some signals associated with the data connection.

13. The method of claim 1,
wherein the discontinuous reception comprises a cycle with OFF durations and ON duration defined in accordance with a timing of the discontinuous reception,
wherein the temporal validity of the second control signal is multiple OFF durations.

14. The method of claim 1,
wherein the first control signal is processed and is transparently forwarded by the second layer and subsequently processed by a further processing logic associated with the first layer, wherein the second control signal is processed by a processing logic associated with the second layer and not processed by the further processing logic.

15. The method of claim 1,
wherein the terminal device is configured to operate in at least one connected mode prior to and after said activating of the discontinuous reception.

16. A terminal device configured to:
configure a data connection on a wireless link between the terminal device and a network based on a first control signal native to a first layer of a transmission protocol stack associated with the wireless link,
participate in a data communication via the data connection,
receive a second control signal native to a second layer of the transmission protocol stack, the second layer being arranged lower in hierarchy of the transmission protocol stack than the first layer,
in response to receiving the second control signal: activate a connected mode discontinuous reception for the data communication, and
during the connected mode discontinuous reception, monitoring of a downlink control channel is suspended,
wherein the data connection and a configuration for the data connection set by RRC control signaling are maintained during the connected mode discontinuous reception,
wherein the second layer is implemented by the Physical Layer of the transmission protocol stack, and
wherein the connected mode discontinuous reception activated in response to the second control signal has a temporal validity.

17. A base station configured to:
configure a data connection on a wireless link between a terminal device and a network based on a first control signal native to a first layer of a transmission protocol stack associated with the wireless link,
participate in a data communication via the data connection,
transmit a second control signal native to a second layer of the transmission protocol stack, the second layer being arranged lower in hierarchy of the transmission protocol stack than the first layer, and
in response to transmitting the second control signal: activate a connected mode discontinuous reception of the terminal device for the data communication,
wherein, during the connected mode discontinuous reception, the terminal device is not required to monitor a downlink control channel,
wherein the data connection and a configuration for the data connection set by RRC control signaling are maintained during the connected mode discontinuous reception,
wherein the second layer is implemented by the Physical Layer of the transmission protocol stack, and
wherein the connected mode discontinuous reception activated in response to the second control signal has a temporal validity.

18. The base station of claim 17, further configured to:
monitor a traffic of the data communication,
wherein the second control signal is selectively transmitted depending on said monitoring of the traffic.

19. A method of operating a base station, comprising:
configuring a data connection on a wireless link between a terminal device and a network based on a first control signal native to a first layer of a transmission protocol stack associated with the wireless link;
participating in a data communication via the data connection;
transmitting a second control signal native to a second layer of the transmission protocol stack, the second layer being arranged lower in hierarchy of the transmission protocol stack than the first layer; and
in response to transmitting the second control signal, activating a connected mode discontinuous reception of the terminal device for the data communication,
wherein, during the connected mode discontinuous reception, the terminal device is not required to monitor a downlink control channel,
wherein the data connection and a configuration for the data connection set by RRC control signaling are maintained during the connected mode discontinuous reception,
wherein the second layer is implemented by the Physical Layer of the transmission protocol stack, and
wherein the connected mode discontinuous reception activated in response to the second control signal has a temporal validity.

* * * * *